United States Patent
Deka et al.

(10) Patent No.: US 10,887,322 B2
(45) Date of Patent: Jan. 5, 2021

(54) PRESERVING INTEGRITY OF MULTI-AUTHORED MESSAGE CONTENT

(71) Applicant: Microsoft Technology Licensing, LLC, Redmond, WA (US)

(72) Inventors: Amarjyoti Deka, Bothell, WA (US); Atul Goyal, Redmond, WA (US); Sung Hwa Jin, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 255 days.

(21) Appl. No.: 15/831,116

(22) Filed: Dec. 4, 2017

(65) Prior Publication Data
US 2019/0173890 A1   Jun. 6, 2019

(51) Int. Cl.
*H04L 29/06* (2006.01)
*G06F 21/64* (2013.01)
*H04L 9/32* (2006.01)
*H04L 12/58* (2006.01)

(52) U.S. Cl.
CPC .......... *H04L 63/126* (2013.01); *G06F 21/645* (2013.01); *H04L 9/3247* (2013.01); *H04L 51/08* (2013.01); *H04L 63/08* (2013.01); *H04L 63/123* (2013.01); *H04L 51/04* (2013.01); *H04L 51/22* (2013.01)

(58) Field of Classification Search
CPC ..... H04L 63/126; H04L 63/08; H04L 9/3247; H04L 51/08; G06F 21/645
See application file for complete search history.

(56) References Cited

U.S. PATENT DOCUMENTS

| 6,199,052 B1 | 3/2001 | Mitty et al. |
| 7,707,423 B2 | 4/2010 | Bugbee |
| 8,504,628 B2 | 8/2013 | Tomkow |
| 8,621,217 B2 | 12/2013 | Seshadri et al. |

(Continued)

FOREIGN PATENT DOCUMENTS

EP   1818850 A1   8/2007

OTHER PUBLICATIONS

"International Search Report and Written Opinion Issued in PCT Application No. PCT/US2018/061398", dated Jan. 30, 2019, 11 Pages.

*Primary Examiner* — Vance M Little
(74) *Attorney, Agent, or Firm* — Merchant & Gould

(57) ABSTRACT

The present methods are directed to authenticating multi-author message content. In aspects, a sender of a message (first author) may utilize a messaging application to create the message and some message content. However, when creating the message, the sender may embed original content (e.g., from a second author) into the message. For instance, the sender may embed original content corresponding to a news article, a Twitter® post, an invoice, a blog post, or any other original content. Traditional systems are able to verify the sender (first author), but cannot verify the authenticity of the embedded original content. That is, when the recipient receives the message, the recipient cannot verify whether or not the sender (or some other individual) altered the original content prior to sending the message. The present systems provide for recipient authentication of the identity of the second author, as well as the authenticity of embedded original content.

20 Claims, 10 Drawing Sheets

(56) References Cited

U.S. PATENT DOCUMENTS

| | | | |
|---|---|---|---|
| 8,812,853 B1 | 8/2014 | Atkins et al. | |
| 9,065,842 B2 | 6/2015 | Vandervort | |
| 9,276,887 B2 | 3/2016 | Jalisatgi et al. | |
| 2003/0050981 A1* | 3/2003 | Banerjee | H04L 63/04 709/206 |
| 2004/0236838 A1 | 11/2004 | Tout | |
| 2004/0255114 A1* | 12/2004 | Lee | H04L 63/123 713/156 |
| 2009/0282108 A1* | 11/2009 | Sachtjen | H04L 9/32 709/206 |
| 2010/0100465 A1 | 4/2010 | Cooke et al. | |
| 2012/0179903 A1* | 7/2012 | Arnold | H04L 9/3247 713/155 |
| 2012/0297469 A1* | 11/2012 | Reeder | H04L 9/3297 726/7 |
| 2013/0124596 A1* | 5/2013 | Damman | G06F 16/907 709/201 |
| 2014/0164776 A1* | 6/2014 | Hook | G06F 21/6218 713/171 |
| 2016/0080368 A1 | 3/2016 | Heurich et al. | |

* cited by examiner

PRESERVING INTEGRITY OF MULTI-AUTHORED MESSAGE CONTENT

BACKGROUND

Electronic messages (e.g., text, email, instant messages, Facebook® posts, Twitter® feeds or tweets, etc.) have recently become a ubiquitous collaborative experience between users. For example, when authoring an email, the sender may interact with many services hosted within and outside the email client. For example, the sender may embed original content created by a third party (e.g., a news article, an invoice, a tweet, etc.) into a message. An email or other message that includes content created by more than one author is called a multi-authored message. As provided herein, an "author" is any creator of content, which may user-created or computer-generated. In the example described, a first author may create the original content embedded in an email and a second author (the sender) may create the text of the email. Some or all of the authors may be users (e.g., news writers, bloggers, tweeters, YouTube creators, book authors, etc.), but may also include authors that are software applications (e.g., applications that create or generate content such as invoices, financial reports, tax returns, etc.).

In traditional email communication, the sender is put at the highest level of trust. Generally, sender validation may be used to determine whether to trust the content of the email. However, if the sender has embedded content of a third party into the message, there is no way to determine if the content has been altered when the recipient receives the email. It is possible that the content has been altered by the sender or some other interim user before the recipient receives the email.

Disclosed herein are ways to preserve the integrity of multi-authored content within a message. When the integrity of the multi-authored content is preserved, the aggregated integrity can be used to achieve recipient trust of the message content and a better user experience.

SUMMARY

This patent document relates generally to devices and methods to authenticate multi-author content of an electronic message.

In one aspect, a computer-implemented method for authenticating content of a message is provided. The method includes receiving, from an author, original content, wherein the original content is associated with a digital signature. Signature metadata is generated for the digital signature and is associated with the original content. An indication to embed the original content in a message of the sender is received, wherein the sender is not the author, and the original content and the signature metadata is embedded in the message. The message is then sent with the original content and the signature metadata to a recipient, wherein the original content is validated based on at least in part on the signature metadata.

In another aspect, a computer-readable storage medium storing computer-executable instructions that when executed by a processor cause the processor to authenticate content of a message, including receiving a message from a sender, where the message includes first content from the sender and second content from an author, and where the sender is not the author, extracting signature metadata associated with the second content, determining whether the second content is authentic based on the signature metadata, and based on the determining, providing a validation icon near the second content in the message.

In still another aspect, a system comprising at least one processing unit and at least one memory storing computer executable instructions that, when executed by the at least one processing unit, cause the system to perform a method. The method comprises: receiving from an author, original content, wherein the original content is associated with a digital signature, generating signature metadata for the digital signature, associating the signature metadata with the original content, receiving an indication to embed the original content in a message of a sender, wherein the sender is not the author, embedding the original content and the signature metadata in the message, and sending the message including the original content and the signature metadata to a recipient, wherein the original content and the signature metadata to a recipient, wherein the original content is validated based at least in part on the signature metadata.

BRIEF DESCRIPTION OF THE DRAWINGS

FIG. 6 illustrates an interface for sending a message, according to an example embodiment.

FIG. 7 illustrates an interface for receiving a message, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present methods are directed to authenticating multi-author message content. In aspects, a sender of a message (first author) may utilize a messaging application to create the message and some message content. However, when creating the message, the sender may embed original content (e.g., from a second author) into the message. For instance, the sender may embed original content corresponding to a news article, a Twitter® post, an invoice, a blog post, or any other original content. Traditional systems are able to verify the sender (first author), but cannot verify the authenticity of the embedded original content. That is, when the recipient receives the message, the recipient cannot verify whether or not the sender (or some other individual) altered the original content prior to sending the message. The present systems provide for recipient authentication of the identity of the second author, as well as the authenticity of embedded original content.

In general, a sender may compose a message that comprises at least one original content item. In aspects, the message may be any electronic message, e.g., an email, a text (e.g., short message service (SMS)), a Facebook® post, etc. In aspects, when the message is ready to be sent, it may be relayed to a processor and transmitted via a network. For example, in order to authenticate the received message, the processor may authenticate the sender. Such authentication can be done using standard techniques such as SMTP-Auth. However, these techniques do not authenticate the content within the message, but only the message itself. Upon authentication, e.g., sender or other authentication, the received message may be delivered to a recipient.

Figure 1:
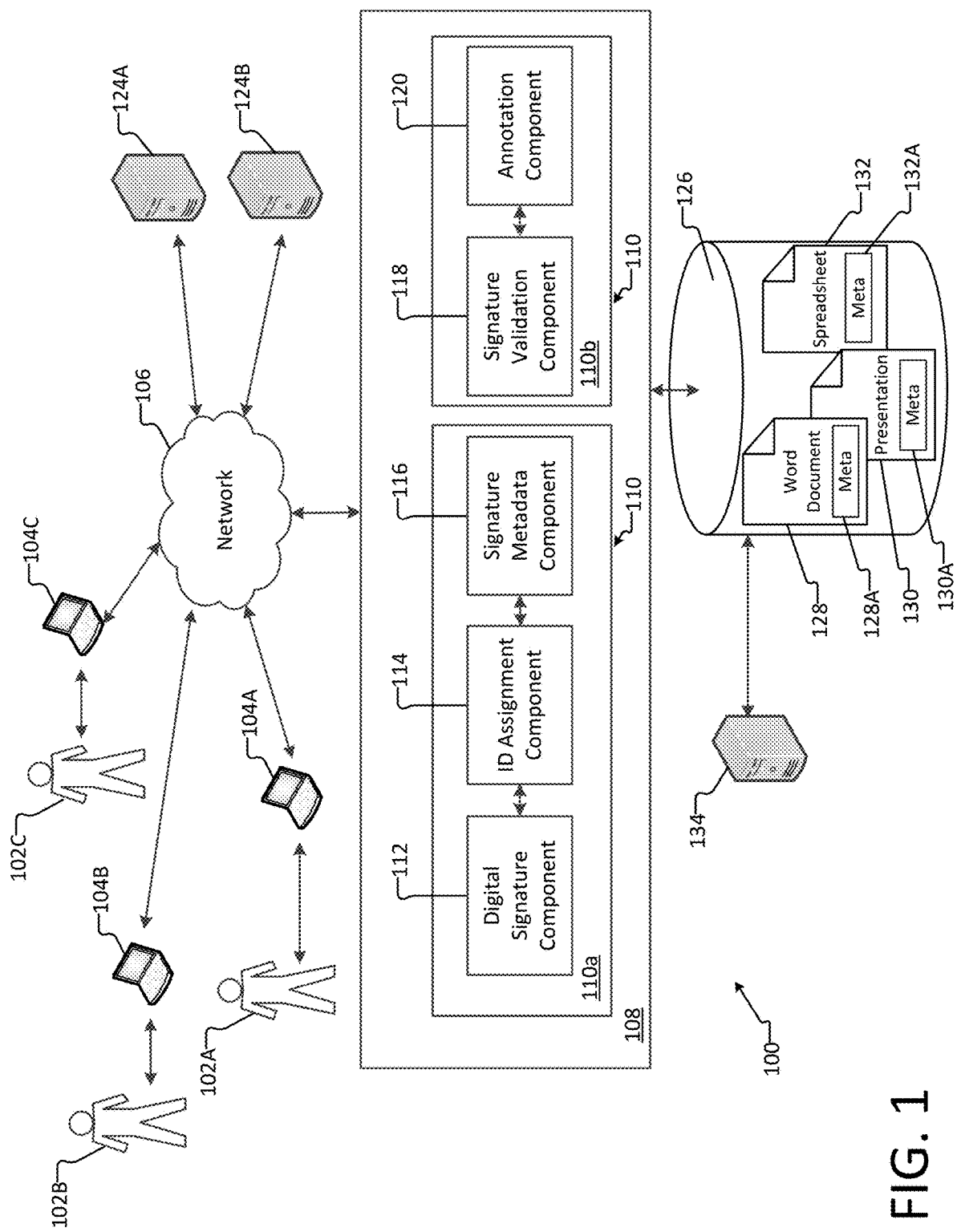
FIG. 1 is a block diagram of system for authenticating content of an electronic message, according to an example embodiment.

FIG. 1 illustrates a system 100 for authenticating content of an electronic message, according to an example embodiment. As illustrated, system 100 may comprise one or more computing devices 104 (e.g., author computing devices 104A, 104B, 104C) that communicate with each other. In an example, a first user 102A (an author) creates original content on a computing device 104A, a second user 102B (a sender) embeds the original content in a message on a computing device 104B, which is sent to a third user 104C (a recipient) on a computing device 104C. In other examples, a computer-based application (e.g., executing on at least one computing device 124A, 124B) creates original content, which then may be embedded in a message sent by first user 102A. Original content created by a computer-based application may include, but is not limited to, an invoice, a form, a financial report, a bank statement, etc. Original content created by a user 102A (the author) includes, but is not limited to, a text document (e.g., article, blog, tweet, book), a presentation, a drawing, photographs, a video (e.g., edited or unedited YouTube post, professional production), or other similar content. In contrast, message content created by a user 104B (the sender) includes, but is not limited to, text within a message (e.g., email message, blog posting, Facebook® post, text message, etc.). The sender of a message may also be considered an "author" as the term is used herein (i.e., a message content creator); however, for purposes of clarity, the message content creator will be referred to herein as a "sender," whereas the original content creator will be referred to herein as an "author." As should be appreciated, the examples of original content, authors, messages, senders, etc., are offered for purposes of explanation and are not intended to be limiting.

In a basic configuration, the computing devices 104A, 104B, 104C are personal or handheld computers having both input elements and output elements operated by one or more users 102A, 102B, 102C. For example, the computing devices 104A, 104B, 104C may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable computing device for executing a content authentication application 110 may be utilized. In a further configuration, computing device 108 is a server computing device that may be in communication over network 106 with one or more other server computing devices (e.g., in a cloud-computing environment with server computing devices 124A and 124B) and/or may be in communication over network 106 with one or more of the computing devices 104A, 104B, 104C (which may be client computing devices, in an aspect).

In aspects, computing device 108 may be representative of any of the computing devices 104A, 104B, 104C (as described above); or may be a server computing device or a collection of server devices (e.g., operating in a cloud-computing environment). For example, computing device 108 may communicate with other aspects of the system via network 106. Network 106 is a computer network such as an enterprise intranet and/or the Internet. In this regard, the network 106 may include a Local Area Network (LAN), a Wide Area Network (WAN), the Internet, wireless and wired transmission mediums. In further aspects, computing device 108 may communicate with aspects of the system via a local network (e.g., an enterprise intranet), whereas computing device 108 may communicate with other components of the system via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

It should be appreciated that, while computing device 108 is shown with components 112-120, computing device 108 may be provided with and/or execute any subset of components 112-120. In an example embodiment, the computer 104A of the author may execute components 112-116, whereas computer 104B of the sender may execute component 116, and computer 104C of the recipient may run components 118-120. In further examples, the computer 104A of the author may execute the content authenticator 110A and the computer 104C of the recipient may execute the content verifier 110B. In this case, the computer 104B of the sender may not execute any component of the content authentication application 110. Rather, after the author has created an authenticated original content package utilizing content authenticator 110A, the sender may use a messaging application (not shown) to retrieve the authenticated original content package from storage (e.g., storage 126), embed the package in a message, and send the message to the recipient computing device 104C.

As described above, the content authentication application 110, which may include content authenticator 110A and/or content verifier 110B, may be implemented on a computing device 108, which may correspond to any of computing devices 104A, 104B, 104C. In a basic configuration, computing device 108 may include at least a processing unit and a system memory for executing computer-readable instructions, e.g., for executing content authentication application 110.

As used herein, original content may be provided as a file, which may include but not limited to a word processing document, a video, an audio, an image, a webpage, a presentation document, a spreadsheet document, and the like. In aspects, files 128, 130, 132 may be associated with signature metadata, e.g., metadata 128A, 130A, 132A, respectively. As should be appreciated, one or more files (e.g., files 128, 130, and 132) may be stored in one or more storage locations accessible to content authentication application 110, e.g., storage 126. In at least some examples, the one or more files may be stored in different storage locations within a distributed environment (e.g., cloud-based computing environment) that is accessible to the content authentication application 110 executing on any of computing devices 108, 104A, 104B, 104C over a network, e.g., network 106.

As illustrated in FIG. 1, the content authentication application 110 may include a content authenticator 110A, which may include a digital signature component 112, an ID assignment component 114, and a signature metadata embedder 116. The content authentication application 110 may further include a content verifier 110B, which may include a signature validation component 118, and an annotation component 120. In some aspects, the content authentication application 110 may be incorporated into or in communication with a messaging application. The various components may be implemented using hardware, software, or a combination of hardware and software. Moreover, the various components may be executed on the same computing device (e.g., computing device 108) or on other computing devices (e.g., computing devices 104A, 104B, 104C). As described in more detail below, the content authenticator 110A may be configured to authenticate original content created by an author and embedded in a message by a sender, and content verifier 110B may be configured to verify the authenticity of the original content embedded in the message.

Generally, when a user, such as a sender 102B, creates a message, such as an email or any other electronic message, they may create all of the message content or the sender may embed original content created by other authors in the message, wherein the author may be another user 102A (e.g., author) or a computer application. For example, a user 102B may create an email and embed original content, e.g., from storage 126. The user 102B may embed one or more of the files 128, 130, and 132, along with the associated metadata 128A, 130A, 132A into an email. As described above, file content may include original content. Content verifier 110B is capable of verifying a digital signature associated with the original content created by the author.

In use, a user 102A may first create original content. The content authenticator 110A executing on computing device 104A of the author (or on a computing device in communication with computing device 104A) may process the original content to provide authenticated original content that includes at least the original content and a digital signature. In some aspects, the digital signature may be based on public-private key signing. In this case, the authenticated original content may refer to the original content, the digital signature and a public key for verifying the digital signature. In other aspects, different validation schemes may be employed for authenticating the original content. In this case, the authenticated original content may refer to the original content, the authentication (e.g., a certificate by a certificate authority), and a means for validating the authentication.

As detailed above, the original content may be "signed" or "authenticated" by the author using a digital signature. For example, the digital signature may comprise a hash operation using a private key of the author or a certificate authority performed by digital signature component 112. Digital signature component 112 may be configured to perform a digital signature operation (e.g., a single signing operation) utilizing a digital signing certificate issued by the certificate authority to digitally sign the original content and create authenticated original content. In aspects, performing the digital signature operation on the original content may further bind a public key corresponding to the private key of the author or certificate authority to the authenticated original content. As should be appreciated, any suitable authentication scheme either now known or later developed may be employed to sign the original content to create authenticated original content.

An ID assignment component 114 may assign an identifier to the authenticated original content. The identifier may be assigned by any suitable means. For example, the identifier may be associated with the author or the certificate authority. In other examples, the identifier may be assigned chronologically based on an authentication time stamp of the original content. In still other aspects, the identifier may be one of a set of unique identifiers that is randomly assigned to the authenticated original content.

Signature metadata component 116 may create signature metadata corresponding to the digital signature and the public key. In some cases, the signature metadata may be termed "system information" and associated with the ID for the original content. For example, when later sending the authenticated original content in a message, the system information may be embedded as a MIME header. Additionally or alternatively, a package may be created including the original content and associated with the signature metadata.

As known to those skilled in the art, various message types may be encoded differently. Depending on the message type, the signature metadata (or system information) may be encoded based on different protocols corresponding to the different message types. For instance, the signature metadata may be encoded in MIME for SMTP (email), in XML for SOAP messages, etc., depending on the protocol and application. In another embodiment, the Exchangeable Image File Format (EXIF) is a file format for allowing metadata information to be inserted into the headers or application segments of a JPEG file. To date, content encodings like MIME allow different devices to render a message based on rendering abilities and encoded policies. For a cross-device notification platform, different formulations of content can be encoded and transmitted for different devices. Also, preferences in the notification schema can be encoded to indicate preferences for different devices given the content at hand, and how different devices should best handle the rendering of portions of content, whether the content is of a single or of multiple types of information, based on device capabilities.

As an alternative to (or in addition to) being sent as an email message, original content may be embedded as an overlay on existing messaging and communication systems. For example, signature metadata may be included in the header (or hidden in the content) of email. Another example of providing a notification via a communication system includes overlaying the notification metadata on a social media network. In general, a schematized notification may accompany any transmission of data, and, as mentioned above, the encoding for the signature metadata can be in different formats, e.g., the metadata may be encoded in MIME for SMTP (email), in XML for SOAP messages, etc., depending on the protocol and application.

In aspects, sender 102B may utilize a messaging application to create and send a message to recipient 102C. When creating the message, the sender 102B may embed original content into the message. For instance, the sender 102B may embed original content corresponding to a news article, a Twitter® post, an invoice, a blog post, or any other original content. In some cases, the sender 102B may embed more than one excerpt of original content into the message (e.g., first original content and second original content). As described above, the original content may be created by an author who is not the sender of the message. In this case, when the recipient receives the message, the recipient does not have a means of verifying whether or not the sender (or some other individual) altered the original content prior to sending the message. In this respect, the present disclosure enables such verification. That is, the original content may be authenticated, as described above, and the authenticated original content may be embedded in the message. For example, the authenticated original content may be selected by the sender 102B from a repository (e.g., storage) maintained by the author or a content service. When the messaging application embeds the authenticated original content into the message, the signature metadata may be associated with the message (e.g., in the MIME header of an email message).

When the computing device 104C of the recipient receives the message with the embedded original content, a content verifier 110B executing on computing device 104C may process the embedded original content to determine whether the original content has been altered in some way.

For example, signature validation component 118 of the content verifier 110B may first validate the identity of the author based on a trusted provider list. In this way, the recipient may first verify that the author itself can be trusted. In one aspect, a trusted provider list (held by the recipient) may include a set of authorized content creators (or "authorized authors") that have been approved by the recipient. In some examples, each of the authorized content creators may be associated with a unique identifier (e.g., issued by the recipient or a certificate authority associated with the recipient). In this way, if the author of the original content presents an appropriate identifier or certificate (e.g., packaged with the original content), the recipient is able to trust the author. In other aspects, the trusted provider list may identify authorized content creators via a uniform resource locator (URL) known to be associated with the authorized content creator. By way of example, Facebook® may only allow original content from a trusted news source, such as the BBC News. Specifically, during onboarding, Facebook® may add BBC New to a trusted provider list in which BBC News is associated with its URL, www.bbc.com. Thereafter, any news feed purporting to be from BBC New, but not originating from www.bbc.com may be rejected. That is, content verifier 110B may not be able to authenticate the identity of the author, so the embedded original content may also fail authentication. As should be appreciated, the above example is provided for purposes of explanation only and is not intended to limit the present disclosure.

For example, a signature validation component 118 of the content verifier 110B may validate a digital signature with reference to a digital certificate. According to traditional examples, to validate a digital signature on original content, a corresponding chain of certificates back to a root trust authority may be found, a corresponding public key of such root trust authority may be found (PU-ROOT), and the public key of the root trust authority may be employed to validate the signature. In the present case, the public key may be provided within the message (e.g., within the MIME header) to the content verifier 110B on the receiving computing device 104C. As detailed above, digitally signing the original content may comprise hashing the original content using a private key of the author or the certificate authority. As the public key corresponds to the private key, if even one letter of the original content has been altered, validation of the digital signature will fail. However, if the original content has not been altered, the digital signature will be validated.

If validation of the digital signature has been validated, an annotation component 120 of the content verifier 110B on recipient computing device 104C may add a validation icon within the message at or near the original content. If the original content cannot be authenticated, either the original content may be displayed without an icon or, alternatively, an icon denoting that authentication failed may be displayed. In some cases, for some applications, e.g., a CRM system, the original content (e.g., invoice, license, contract, etc.) will not be honored by the recipient 102C if the original content is not authenticated.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
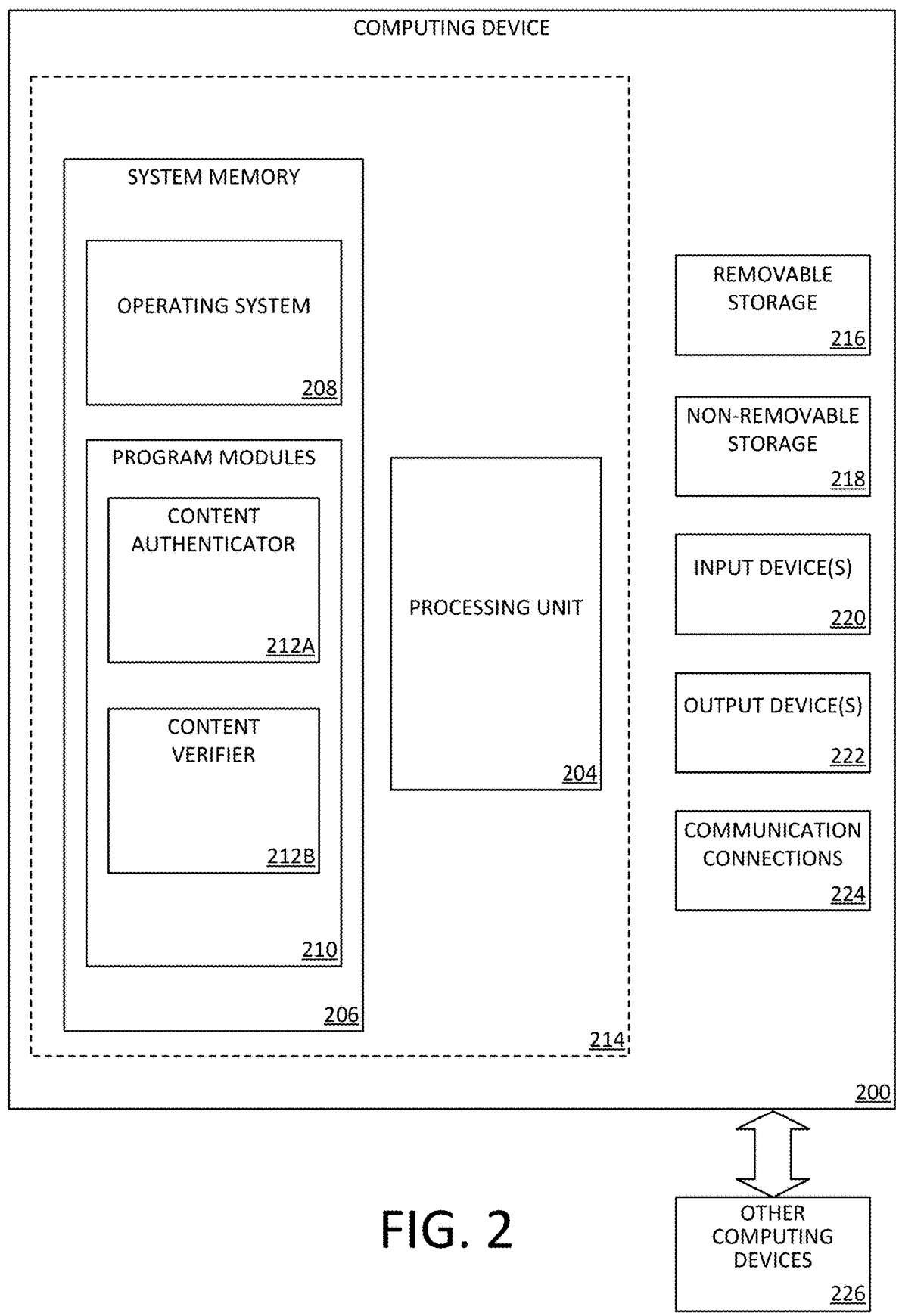
FIG. 2 is a block diagram illustrating example physical components of a computing device with which aspects of the disclosure may be practiced.

FIG. 2 is a block diagram illustrating physical components (e.g., hardware) of a computing device 200 with which aspects of the disclosure may be practiced. The computing device components described below may have computer executable instructions for implementing one or more of the program modules 210 on a computing device (e.g., computing devices 104A, 104B, 104C). In a basic configuration, the computing device 200 may include at least one processing unit 204 and a system memory 206. Depending on the configuration and type of computing device, the system memory 206 may comprise, but is not limited to, volatile storage (e.g., random access memory), non-volatile storage (e.g., read-only memory), flash memory, or any combination of such memories. The system memory 206 may include an operating system 208 and one or more program modules 210 suitable for running content authenticator 212A and/or content verifier 212B, such as one or more components with regard to FIG. 1.

The operating system 208, for example, may be suitable for controlling the operation of the computing device 200. Furthermore, embodiments of the disclosure may be practiced in conjunction with a graphics library, other operating systems, or any other application program and is not limited to any particular application or system. This basic configuration is illustrated in FIG. 2 by those components within a dashed line 214. The computing device 200 may have additional features or functionality. For example, the computing device 200 may also include additional data storage devices (removable and/or non-removable) such as, for example, magnetic disks, optical disks, or tape. Such additional storage is illustrated in FIG. 2 by a removable storage device 216 and a non-removable storage device 218.

As stated above, a number of program modules and data files may be stored in the system memory 206. While executing on the processing unit 204, the program modules 210 (e.g., content authenticator 212A and content verifier 212B) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 200 may also have one or more input device(s) 220 such as a keyboard, a mouse, a pen, a sound or voice input device, a touch or swipe input device, etc. The output device(s) 222 such as a display, speakers, a printer, etc. may also be included. The aforementioned devices are examples and others may be used. The computing device 200 may include one or more communication connections 224 allowing communications with other computing devices 226. Examples of suitable communication connections 224 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 206, the removable storage device 216, and the non-removable storage device 218 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 200. Any such computer storage media may be part of the computing device 200. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 3:
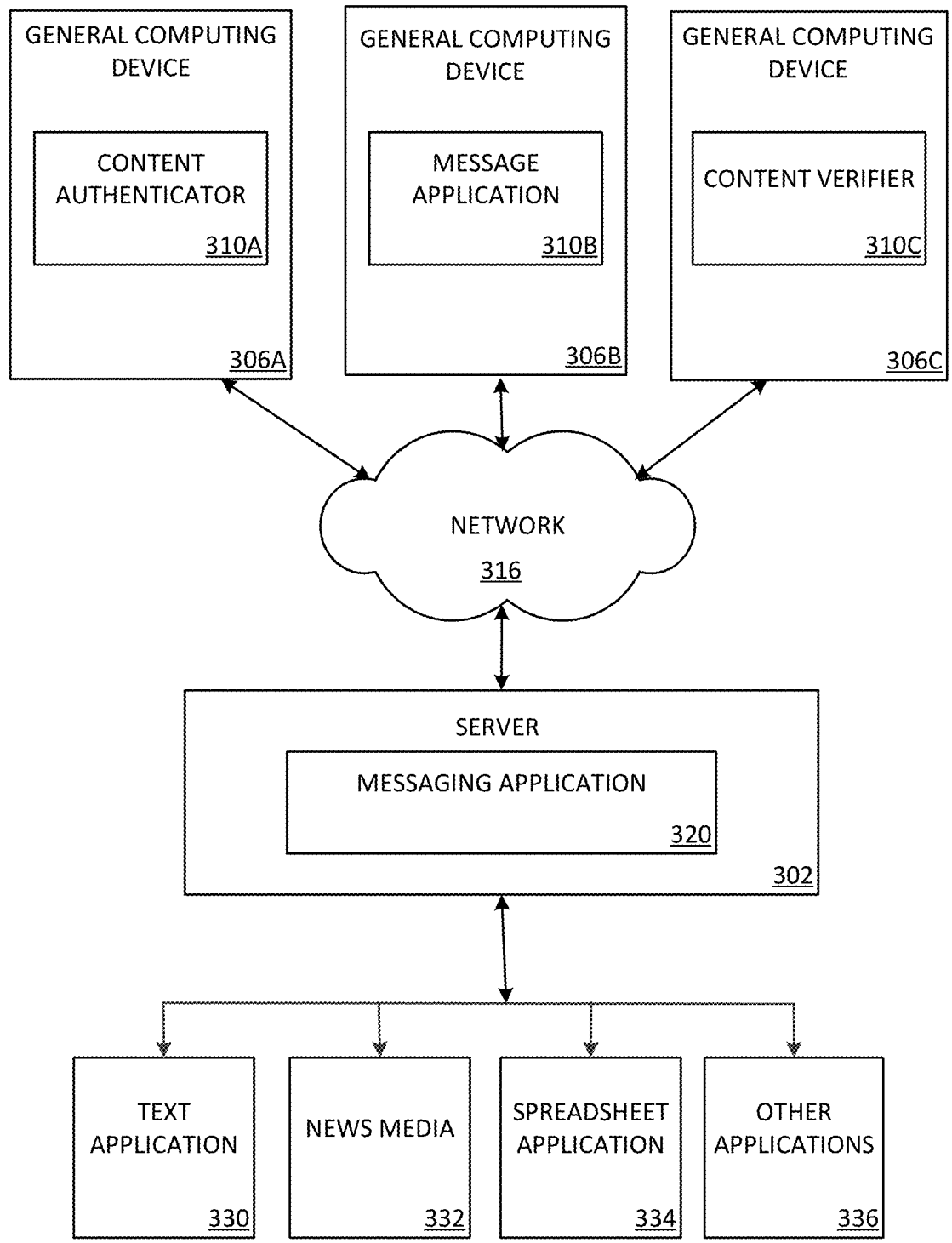
FIG. 3 is a block diagram of system for authenticating content of an electronic message, according to an example embodiment.

FIG. 3 illustrates one aspect of the architecture of a system as described herein comprising general computing devices 306A, 306B, 306C (e.g., personal computers, mobile devices, laptop computers, etc.) and a server 302, as described above. Server 302 may execute or host a messaging application (e.g., an email application, instant messaging application, etc.) that may be in communication with a content authentication application executing on one or more of the computing devices 306A, 306B, 306C. For example, a content authenticator 310A may be executing on computing device 306A, which may be associated with an author, and a content verifier 310C may be executing on computing device 306C. In some aspects, computing device 306B may be executing messaging application 310B, which may be in communication with one or more of the content authenticator 310A executing on computing device 306A, the content verifier 310C executing on computing device 306C and/or the messaging application 320 executing on server 302. Other applications executing on or in communication with server 302 may include text applications 330, new media 332, spreadsheet applications 324, and other applications 336. Still further, other applications 336 may include spelling and grammar checking application, invoice-creating applications, drawing applications, audio applications, and other similar applications for creating original content. The server device 302 may provide data, including original content to and from computing devices 306A, 306B, 306C. By way of example, the computer system described above with respect to FIGS. 1-3 may be embodied in any of the computing devices 306A, 306B, 306C (e.g., a personal computer, a tablet computing device and/or a mobile computing device) or in server 302.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed herein.

Figure 4:
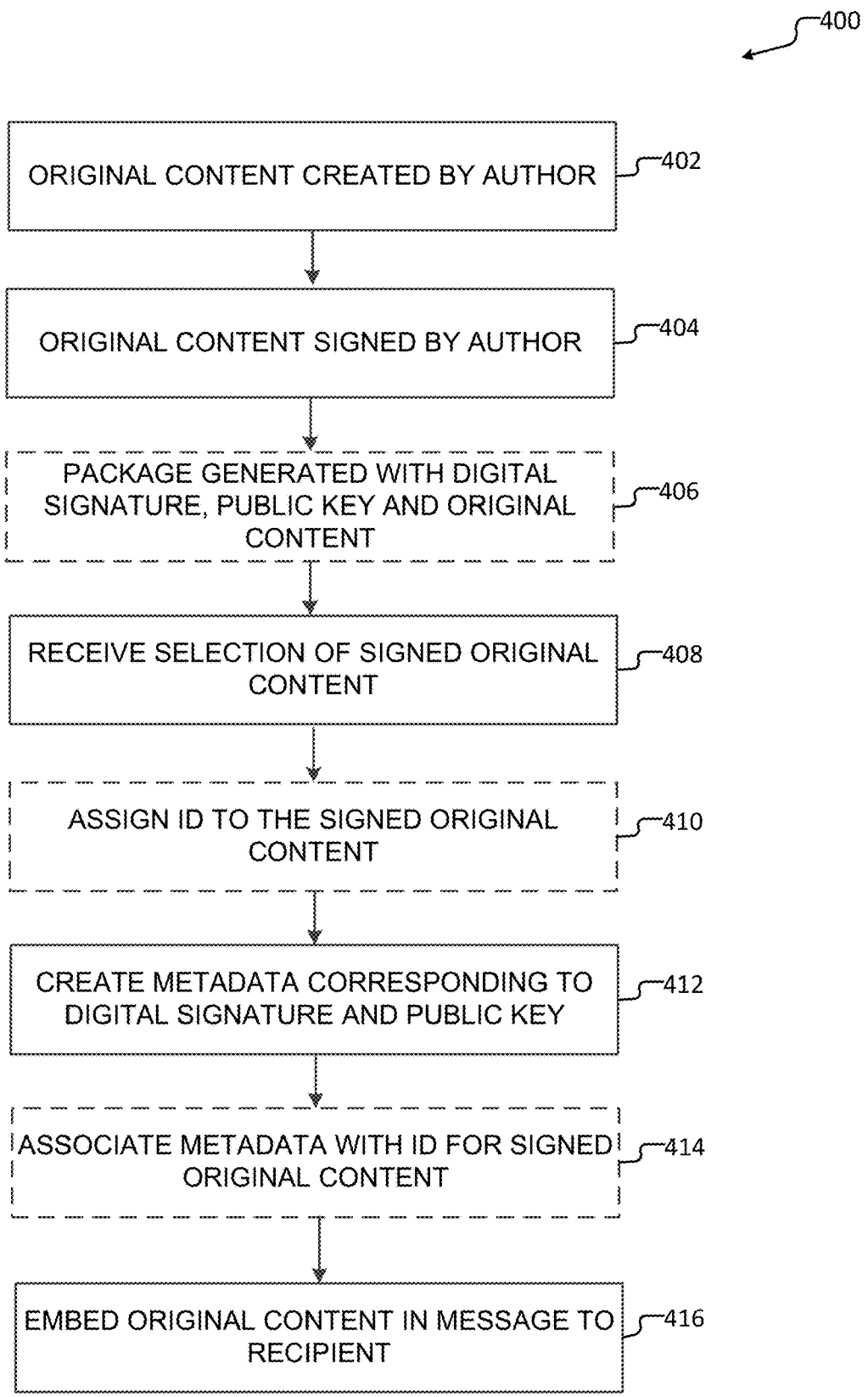
FIG. 4 is a flowchart of an example method for authenticating content of an electronic message, according to an example embodiment.

FIG. 4 illustrates a method of assigning a digital signature to original content of a message, according to an example embodiment.

Method 400 to authenticate original content begins with creation operation 402, where original content is create by an author. Original content includes, but is not limited to a text document (e.g., article, blog, tweet, book), a presentation, a drawing, photographs, a video (e.g., edited or unedited YouTube post, professional production), or other similar content.

Method 400 next includes digital signature operation 404, where the original content is signed by a digital signature of the author. In aspects, the original content may be "signed" or "authenticated" using a content authentication application (or a module of a content authentication application such as content authenticator 110A) to generate a digital signature of the author or certificate authority. For example, the digital signature may comprise a hash operation using a private key of the author or a certificate authority. For example, performing the digital signature operation 404 on the original content may bind a public key corresponding to the private key of the author or certificate authority to the authenticated original content. As should be appreciated, any suitable encryption or authentication scheme either now known or later developed may be employed to sign the original content to create authenticated original content.

At optional package operation 406, a package may be generated including the original content, the digital signature, and the public key. In further aspects, the package may be stored such that the package may be selected for embedding into a message by a sender.

At receive operation 408, a selection of the signed original content may be received by a messaging application. For example, a sender may select the signed original content for embedding into a message. In aspects, the signed original content may be selected from an original content repository associated with the author itself (e.g., blog site) or a content provider (e.g., news outlet, video-streaming website, digital book or music outlet, etc.).

At optional assign operation 410, the messaging application may assign an identifier to the original content. The identifier may be assigned by any suitable means. For example, the identifier may be associated with the author or the certificate authority. In other examples, the identifier may be assigned chronologically based on an authentication time stamp of the original content. In still other aspects, the identifier may be one of a set of unique identifiers that is randomly assigned to the authenticated original content.

At create metadata operation 412, the messaging application may extract the digital signature and the public key from the original content and may create metadata representative of the digital signature and the public key.

At optional associate operation 414, the messaging application may associate the metadata with the identifier for the original content. In aspects, the metadata may be associated with the identifier in a table, an index, a database, or otherwise. In other aspects, rather than associating the metadata with an identifier for the original content, the messaging application may create the metadata and directly associate the metadata with a message, e.g., a MIME header for the message. In still other aspects, the metadata may be associated with the original content package.

At embed operation 416, the messaging application may embed the original content into a message. In aspects, when the original content is embedded in the message, the original content may be provided in a window, an overlay, or may be otherwise off-set from other message content. Additionally, the metadata representing the digital signature and the public key may be retrieved and associated with the message, e.g., within a MIME header of the message. Alternatively, the original content package may comprise the metadata and may be embedded within the message. The original content embedded message may then be sent to the recipient. Broadly, the recipient may be an email recipient, or may be a follower of the sender on a social media network, or anyone who has access to read the social media post. The digital signature is used for verifying the contents of the message of a multi-authored email by the recipient.

In an example embodiment according to the method 400, an invoicing service (the author) may create an invoice (original content) for a customer (the recipient) on behalf of a third party client (the sender). The invoicing service (the author) may generate a digital signature on the invoice. When the third party client (the sender) embeds the invoice (original content) in a message, and the generated digital signature and public key information may be attached as metadata to the message. The message with the embedded invoice may then be sent by the third party client to the customer (recipient).

In another example embodiment according to the method 400, a first user (the author) may create a social media post (original content). The first user (the author) may generate a digital signature on the social media post. A second user (the sender) may embeds the social media post (original content) in a message, and the generated digital signature and public key information may be attached as metadata to the message. The message with the embedded social media post may then be sent to a third user (recipient) and/or posted as a second media posting available to multiple third users (recipients).

Figure 5:
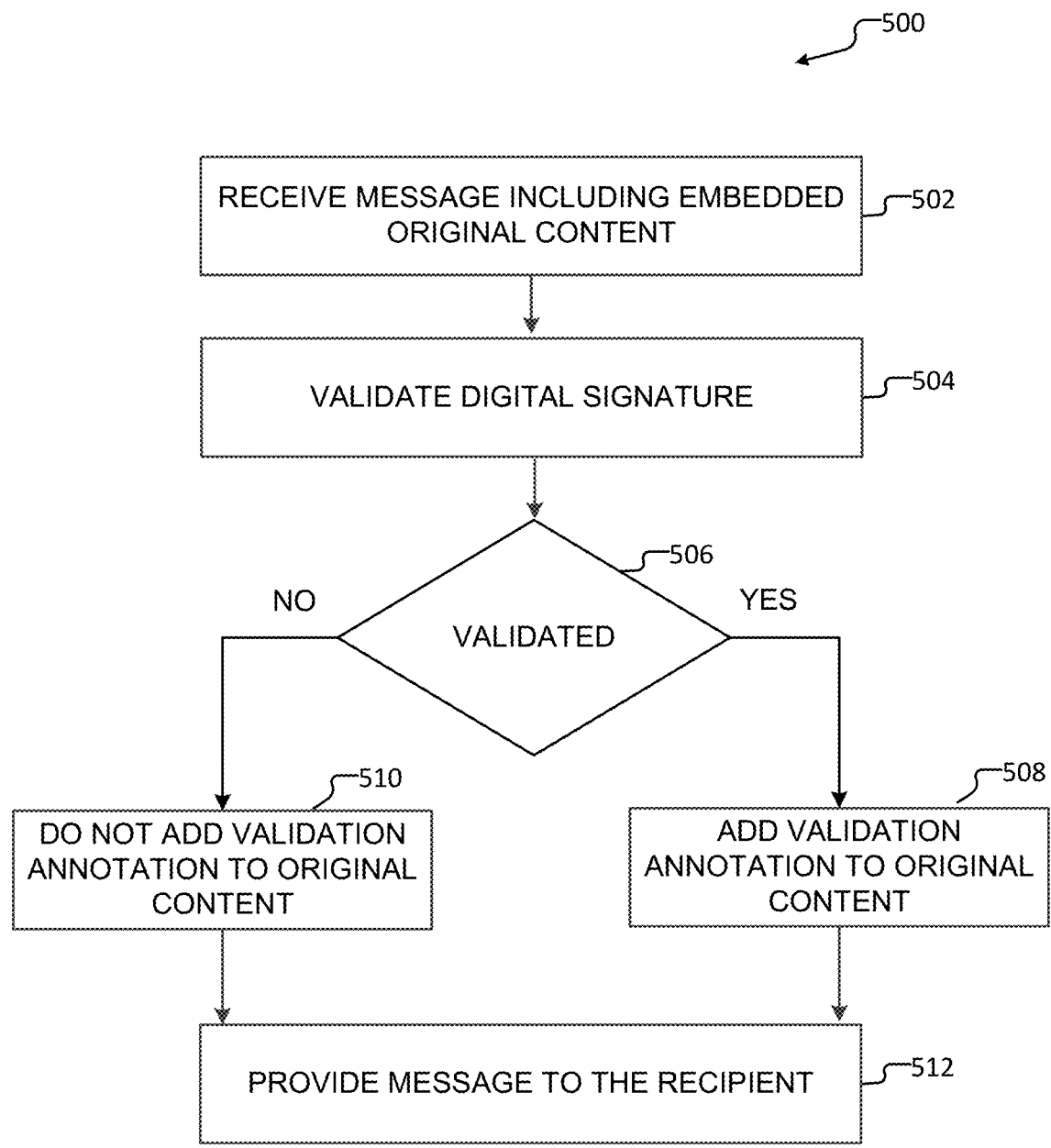
FIG. 5 is a flowchart of an example method for authenticating content of an electronic message, according to an example embodiment.

FIG. 5 illustrates a method of verifying original content sent by a sender to a recipient 500.

At receive operation 502, a messaging including embedded original content may be received by a recipient. For example, a messaging application on a computing device associated with the recipient may receive the message from a sender. As described above, the embedded original content may be signed with a digital signature. That is, the original content may be hashed using a private key of the author. In aspects, the digital signature and a public key corresponding to the private key may be associated as metadata (e.g., within a MIME header) to the message.

At validate operation 504, the messaging application may validate the message as well as the embedded original content. As explained above in more detail, the message may be validated by validating the sender. However, to validate the embedded original content, the public key may be retrieved from the message MIME header and employed to validate the digital signature.

At determination operation 506, it may be determined whether the original content is validated. If the original content was changed in any way after the original content was signed, validation will not be successful and the method may progress to no annotation operation 510. Alternatively, if the original content was not changed, validation will be successful and the method may progress to annotation operation 508.

At annotation operation 508, if the digital signature has been validated, a delivery agent of the messaging application may add an annotation at or near the original content. An annotation may be an icon, such as a green checkmark, or other similar icon indicative of a positive validation of the digital signature. In this case, when the message is provided to the recipient, the recipient is able to easily confirm that the original content has been validated and has not been altered.

At no annotation operation 510, if the digital signature was not validated, a delivery agent of the messaging application may not add an annotation at or near the original content. Alternatively, a negative annotation may be displayed at or near the original content within the message. For instance, the negative annotation may be a red "X" or similar icon indicative of a negative validation of the digital signature. In this case, when the message is provided to the recipient, the recipient is able to easily confirm that the original content has not been validated and has been altered.

At provide operation 512, the messaging application may provide the message including the embedded original content to the recipient. In this case, the recipient is able to view the message and the embedded original content. Additionally, based on the annotation, the recipient is able to easily recognize whether or not original content has been validated.

In an example embodiment according to the method 500, an invoicing service (the author) may create an invoice (original content) for a customer (the recipient) on behalf of a third party client (the sender). The third party client (the sender) may send the invoice to the customer (recipient) embedded in a message. After the content authentication operations have been performed, as described above, the customer (recipient) is able to easily confirm that the invoice has (or has not) been verified based on the annotation provided at or near the invoice within the message.

In another example embodiment according to the method 500, a first user (the author) may create a social media post (original content). The first user (the author) may generate a digital signature on the social media post. A second user (the sender) may embeds the social media post (original content) in a message, and the generated digital signature and public key information may be attached as metadata to the message. The message with the embedded social media post may then be sent to a third user (recipient) and/or posted as a second media posting available to multiple third users (recipients). After the content authentication operations have been performed, as described above, the third user (recipient) is able to easily confirm that the original content has (or has not) been verified based on the annotation provided at or near the original content within the message.

Figure 6:
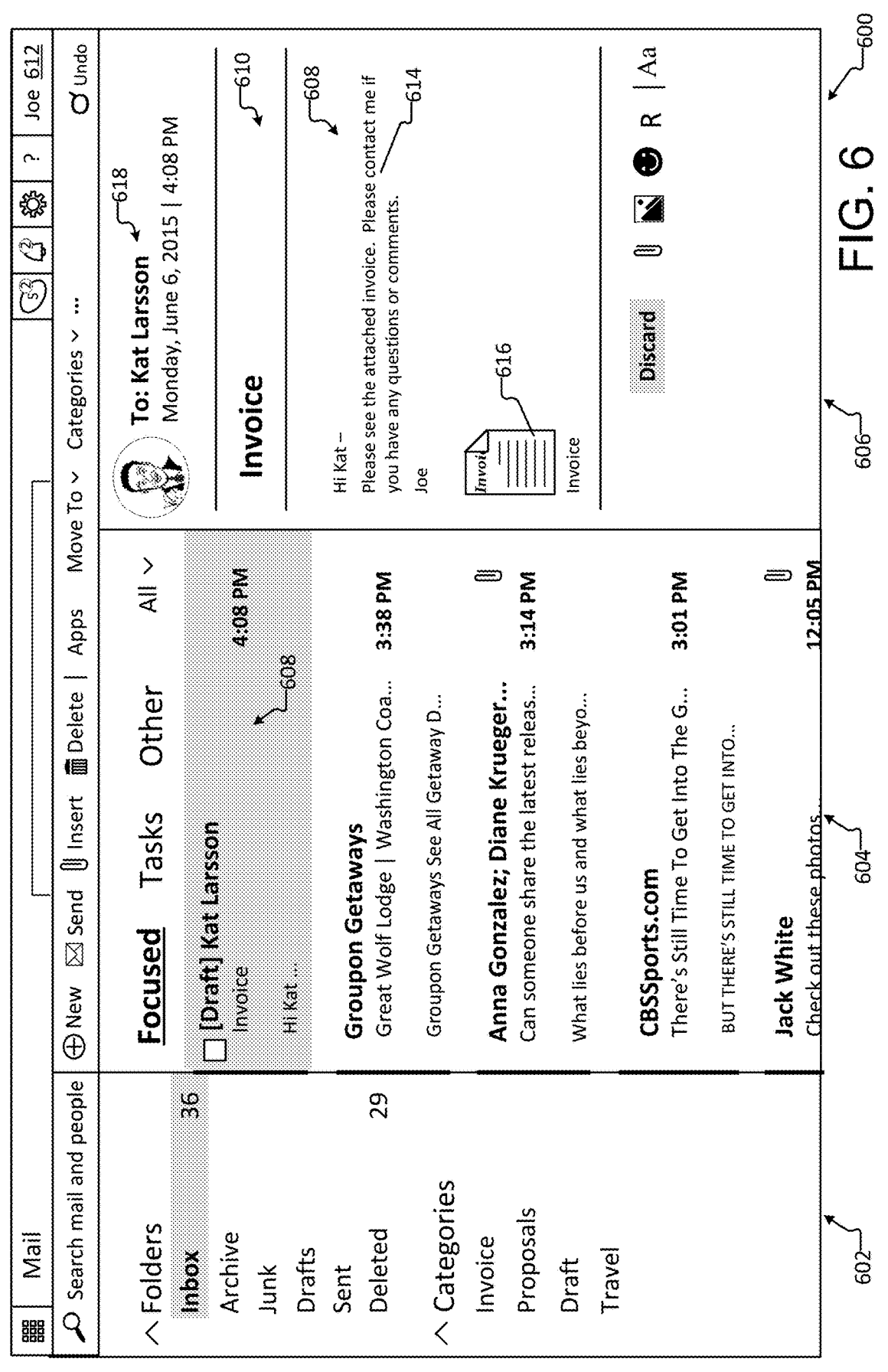

FIG. 6 illustrates an interface for sending a message, according to an example embodiment.

As illustrated, an interface 600 of a messaging application (e.g., email application) is provided. Interface 600 includes a navigation pane 602, a list pane 604, and a reading pane 606. Message 608 is displayed in reading pane 606 and list pane 604. Message 608 includes a subject line 610, entitled "Invoice," and a recipient 618 named "Kat Larsson." As illustrated, message 608 is an email (see, e.g., list pane 604) that is being drafted by "Joe" (see, e.g., user identifier 612). Message 608 further includes message content 614, which states: "Hi Kat—Please see the attached invoice. Please contact me if you have any comments or questions." Additionally, an authenticated document 616, entitled "Invoice," has been embedded in message 608.

In aspects, Joe (the sender) may select authenticated document 616 (original content) and may embed the invoice into the message. In aspects, the messaging application may extract a digital signature and public key associated with the authenticated document 616 and may create metadata representative of the digital signature and public key. Additionally, the messaging application may embed the metadata in a MIME header of the message 608 (not shown). Message 608 may then be sent to the recipient 618.

As should be appreciated, the various devices, components, etc., described with respect to FIG. 6 are not intended to limit the systems and methods to the particular components described. Accordingly, additional topology configurations may be used to practice the methods and systems herein and/or some components described may be excluded without departing from the methods and systems disclosed herein.

Figure 7:
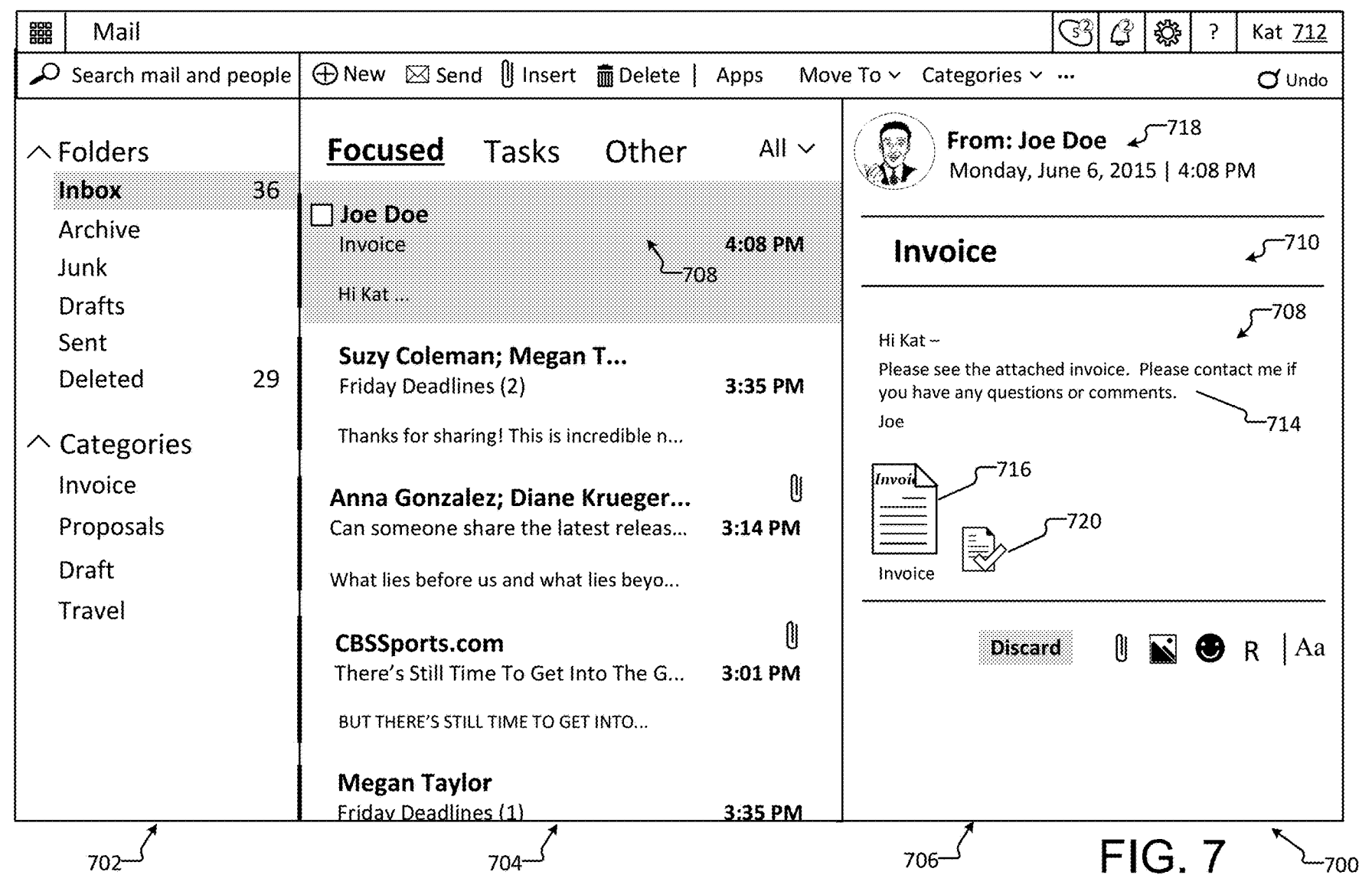

FIG. 7 illustrates an interface for receiving a message, according to an example embodiment.

As illustrated, an interface 700 of a messaging application (e.g., email application) is provided. Interface 700 includes a navigation pane 702, a list pane 704, and a reading pane 706. Message 708 is displayed in reading pane 706 and list pane 704. Message 708 is an email that has been received by recipient "Kat Larsson" (see e.g., user identifier 712) from sender 718 "Joe Doe." Message 708 includes message content 714, written by sender 718, and embedded document 716 titled "Invoice." In aspects, the message 708 may further be associated with metadata (e.g., within a MIME header) (not shown). The messaging application executing on or in communication with a computing device associated with recipient 718 may extract the public key from the metadata to validate the document 716.

When the document 716 has been validated, icon 720 that denotes document 716 has been authenticated may be provided. Alternatively, when document 716 has not been validated, either no annotation (not shown) or a negative annotation (not shown) may be displayed at or near document 716.

FIGS. 1-7 and the associated descriptions provide a discussion of a variety of operating environments in which aspects of the disclosure may be practiced. However, the devices and systems illustrated and discussed with respect to FIGS. 1-7 are for purposes of example and illustration and are not limiting of a vast number of computing device configurations that may be utilized for practicing aspects of the disclosure, as described herein.

As described, the sender may attach a document to an email, the document representing the original content for an author. Other situations are also envisioned. For example, a recipient may receive a message with embedded original content as text within the email. In some cases, the recipient may forward the message to a second recipient. In this case, the messaging application associated with the second recipient may then receive the message and validate the embedded original content using the public key contained in the MIME header (which is passed from the first recipient in the forwarded message). In this case, so long as the second sender (first recipient) did not alter the original content embedded within the message, the messaging application of the second recipient may validate the original content and display a validation icon to the second recipient.

In yet another embodiment, the authentication may be utilized in applications other than an email application, for example, social media and news media applications. In an example, a user may share a news article through their social media. The news article would have a generated digital signature associated with the article. A publishing application assigns the original content (the news article) with an ID and embeds the signature metadata as system information. When a user shares the news article through their social media account, an authentication symbol is associated with the article, so end-users are assured that what they are reading has not been altered.

Figure 8A:
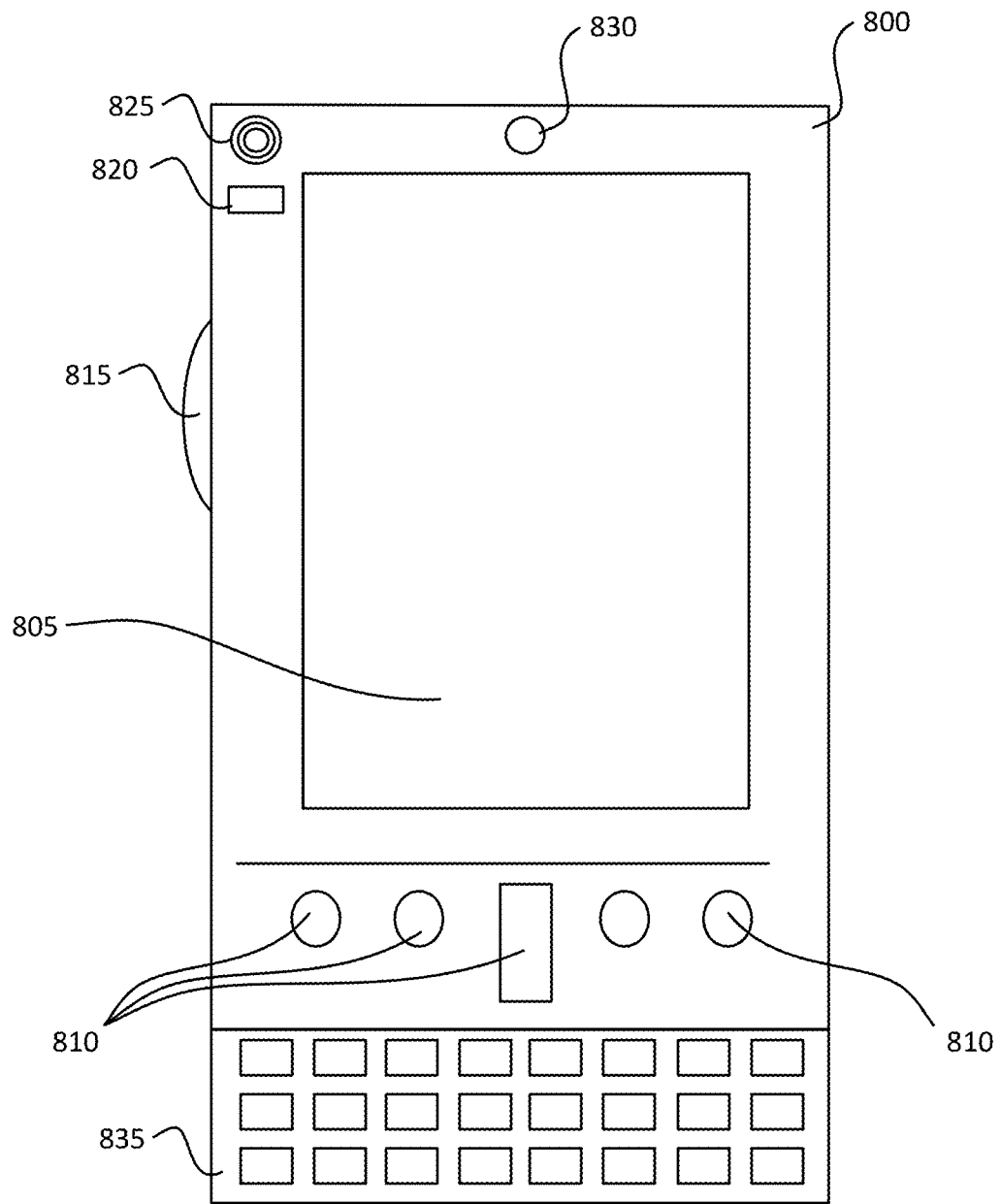
FIGS. 8A and 8B are simplified block diagrams of a mobile computing device with which aspects of the present disclosure may be practiced.
Figure 8B:
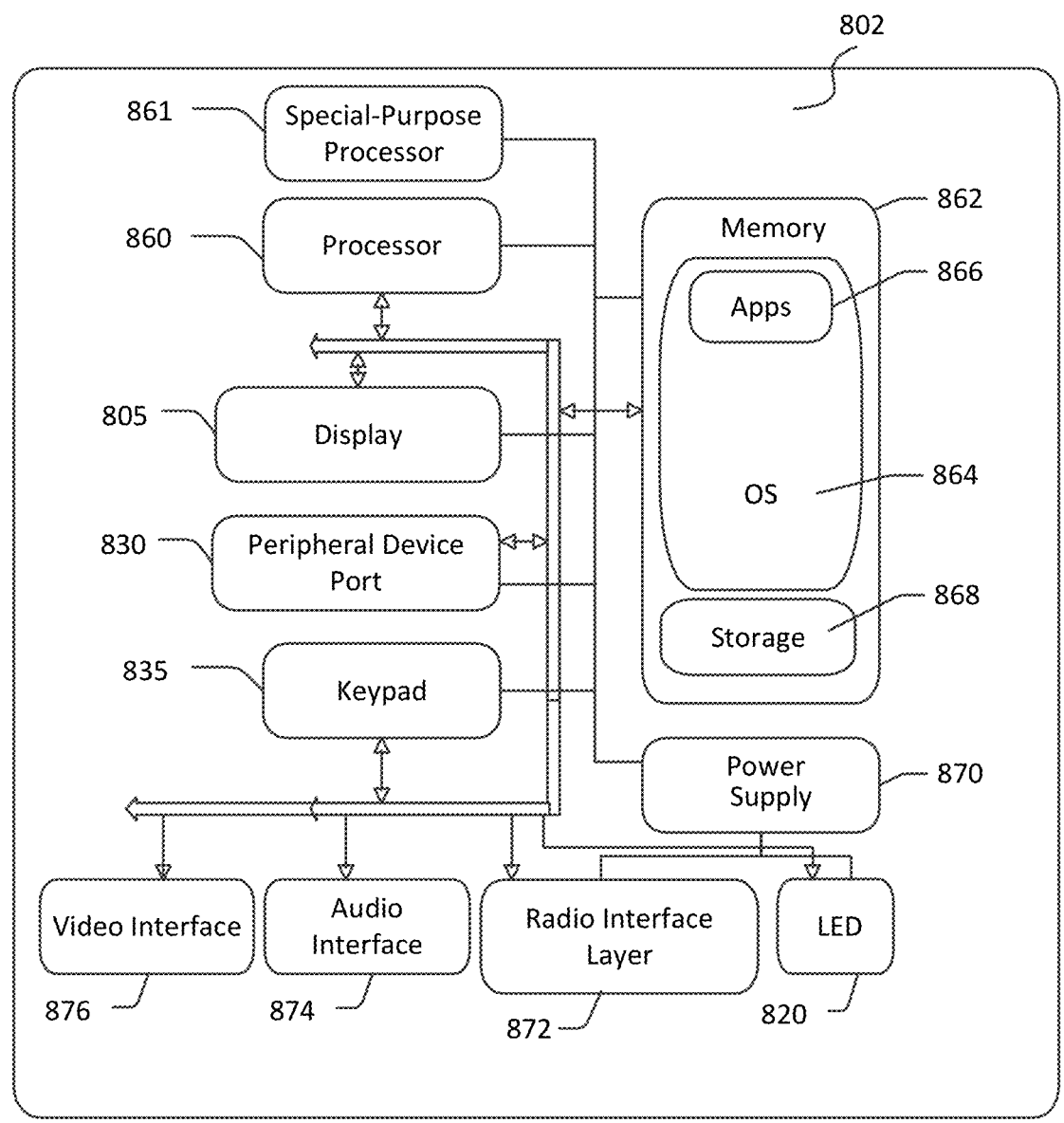

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In an aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing a consensus determination application as described herein (e.g., message parser, suggestion interpreter, opinion interpreter, and/or consensus presenter, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like. Audio interface 874, video interface 876, and keyboard 835 may be operated to generate one or more messages as described herein.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

Figure 9:
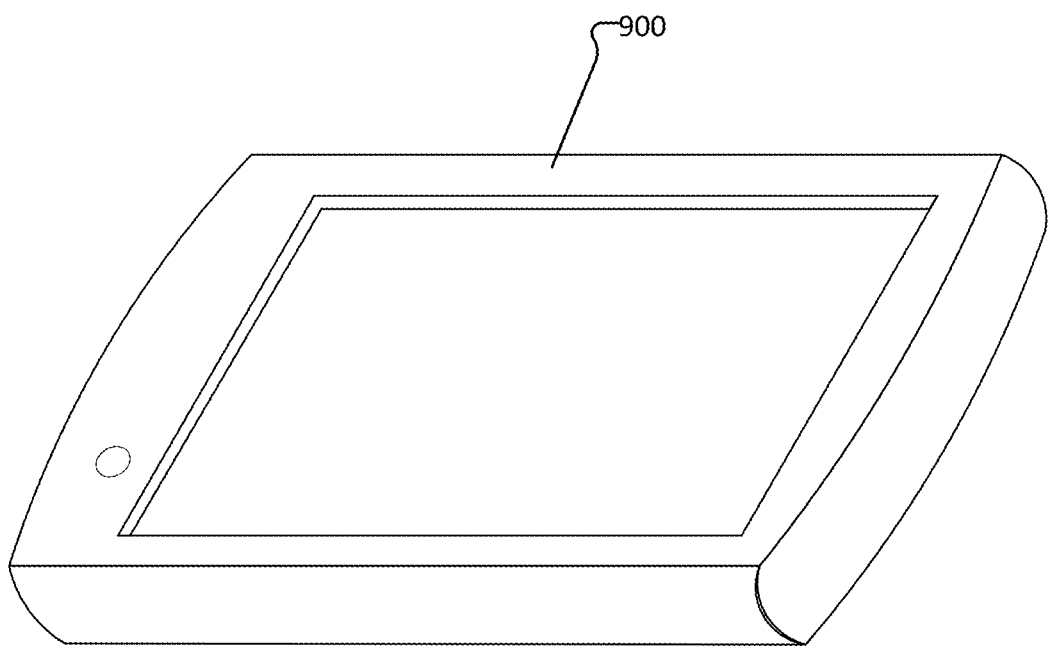
FIG. 9 illustrates a tablet-computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

In either of these embodiments, a second icon may be associated with the original content that denotes the authenticity of the content cannot be verified. Content may not be able to be verified for multiple reasons, including, but not limited to, the digital signature is not associated with the content, or the content may be been altered The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for authenticating content of a message, the method comprising:
   receiving, from an author, original content created external to a message application by the author, wherein the original content is associated with a digital signature of the author;
   generating signature metadata for the digital signature of the author;
   storing the original content and the signature metadata in a repository associated with one or more of the author and a content provider;
   receiving an indication to embed the original content in a message of a sender, wherein the sender is not the author;
   in response to receiving the indication, retrieving the original content and the signature metadata from the repository;
   embedding the original content in the message;
   embedding the signature metadata into a header of the message; and
   sending the message including the original content and the signature metadata to a recipient, wherein the original content is authenticated based at least in part on the signature metadata.

2. The computer-implemented method of claim 1, further comprising:
   embedding the signature metadata as system information.

3. The computer-implemented method of claim 2, wherein the signature metadata is embedded as the system information in a MIME header.

4. The computer-implemented method of claim 2, further comprising:
   assigning an identifier to the original content; and
   associating the system information with the identifier.

5. The computer-implemented method of claim 1, further comprising:
   receiving, from a second author, second original content created external to the message application by the second author, wherein the second original content is associated with a second digital signature;
   generating second signature metadata for the second digital signature;
   storing the second original content and the second signature metadata in a repository associated with one or more of the second author and a content provider;
   receiving an indication to embed the second original content in the message of the sender, wherein the sender is not the second author;
   in response to receiving the indication, retrieving the second original content and the second signature metadata from the repository;
   embedding the second original content and the second signature metadata in the message containing the original content and the signature metadata; and
   sending the message including the original content, the signature metadata, the second original content, and the second signature metadata to the recipient, wherein the second original content is authenticated based at least in part on the second signature metadata.

6. The computer-implemented method of claim 1, further comprising:
   creating a package including the original content and the signature metadata.

7. The computer-implemented method of claim 1, wherein the message is an e-mail message.

8. The computer-implemented method of claim 1, wherein the message application is used by the sender to create the message.

9. A computer-implemented method for authenticating content of a message, the method comprising:
   receiving a message from a sender within a message application, wherein the message includes first content from the sender created internal to the message application and second content from an author created external to the message application, and wherein the sender is not the author;
   validating the first content based on validating the sender;
   extracting signature metadata associated with the second content from a header of the message, wherein the signature metadata is for a digital signature of the author that is associated with the second content, and the signature metadata is stored in and retrieved from a repository associated with one or more of the author and a content provider for embedding into the header of the message in response to receiving an indication to embed the second content in the message and prior to a transmission of the message by the sender;
   determining whether the second content is authentic based on the signature metadata; and
   based on the determining, providing an icon near the second content in the message to indicate an authenticity of the second content.

10. The computer-implemented method of claim 9, further comprising:
    determining that the second content is authentic; and
    providing an authentic icon near the second content in the message.

11. The computer-implemented method of claim 10, wherein the authentic icon verifies to a recipient that the second content has not been altered.

12. The computer-implemented method of claim 9, further comprising:
    determining that the second content is not authentic; and
    providing a non-authentic icon near the second content in the message.

13. The computer-implemented method of claim 12, wherein the non-authentic icon indicates to a recipient that the second content has been altered.

14. The computer-implemented method of claim 9, wherein the message includes third content from a second author created external to the message application, and wherein the sender is not the second author, the computer-implemented method further comprising:
- extracting second signature metadata associated with the third content;
- determining whether the third content is authentic based on the second signature metadata; and
- based on the determining, providing a second icon near the third content in the message.

15. The computer-implemented method of claim 14, further comprising:
- determining that the third content is authentic; and
- providing a second authentic icon near the third content in the message.

16. The computer-implemented method of claim 15, wherein the second authentic icon verifies to a recipient that the third content has not been altered.

17. A system comprising:
- at least one processing unit; and
- at least one memory storing computer executable instructions that, when executed by the at least one processing unit, cause the system to:
  - receive, from an author, original content created external to a message application by the author, wherein the original content is associated with a digital signature of the author;
  - generate signature metadata for the digital signature of the author;
  - store the original content and the signature metadata in a repository associated with one or more of the author and a content provider;
  - receive an indication to embed the original content in a message of a sender, wherein the sender is not the author;
  - retrieve the original content and the signature metadata from the repository;
  - embed the original content in the message;
  - embed the signature metadata into a header of the message; and
  - send the message including the original content and the signature metadata to a recipient, wherein the original content is authenticated based at least in part on the signature metadata.

18. The system of claim 17, wherein the computer executable instructions further cause the system to:
- embed the signature metadata as system information.

19. The system of claim 17, wherein the signature metadata is embedded in a MIME header.

20. The system of claim 17, wherein the computer executable instructions further cause the system to:
- receive, from a second author, second original content created external to the message application by the second author, wherein the second original content is associated with a second digital signature;
- generate second signature metadata for the second digital signature;
- store the second original content and the second signature metadata in a repository associated with one or more of the second author and a content provider;
- receive an indication to embed the second original content in the message of the sender, wherein the sender is not the second author;
- retrieve the second original content and the second signature metadata from the repository;
- embed the second original content and the second signature metadata in the message containing the original content and the signature metadata; and
- send the message including the original content, the signature metadata, the second original content, and the second signature metadata to the recipient, wherein the second original content is authenticated based at least in part on the second signature metadata.

* * * * *